United States Patent [19]
Fukushima

[11] 3,938,275
[45] Feb. 17, 1976

[54] LURE FOR CATCHING SQUID AND THE LIKE

[76] Inventor: Juzo Fukushima, 12-13, Omiya, Sasebo, Nagasaki, Japan

[22] Filed: Oct. 24, 1974

[21] Appl. No.: 517,715

[52] U.S. Cl. ............... 43/42.24; 43/17.6; 43/42.06; 43/42.32; 43/42.36; 43/44.82
[51] Int. Cl.² ................... A01K 85/00; A01K 83/00
[58] Field of Search ............... 43/42.36, 42.37, 42.7, 43/44.82, 42.24

[56] References Cited
UNITED STATES PATENTS

| | | | |
|---|---|---|---|
| 146,443 | 1/1874 | Fitzgerald | 43/42.7 |
| 289,508 | 12/1883 | Dawson | 43/44.82 |
| 890,549 | 6/1908 | Zamel | 43/42.37 |
| 1,508,111 | 9/1924 | Meyer | 43/42.37 |
| 3,092,412 | 6/1963 | Drake | 43/44.82 |
| 3,224,133 | 12/1965 | Emard | 43/42.36 |
| 3,688,430 | 9/1972 | Balch | 43/42.36 |

*Primary Examiner*—Warner H. Camp
*Attorney, Agent, or Firm*—Frank J. Jordan

[57] ABSTRACT

A lure for catching squid and the like includes a hollow elastic body and a hook device disposed at one end of the elastic body. Means are provided for connecting the hook device to a fishing line such that the elastic body is adapted to be compressed to facilitate catching squid or the like on the hook device when the fishing line is pulled up.

3 Claims, 6 Drawing Figures

U.S. Patent Feb 17, 1976 Sheet 1 of 2 3,938,275
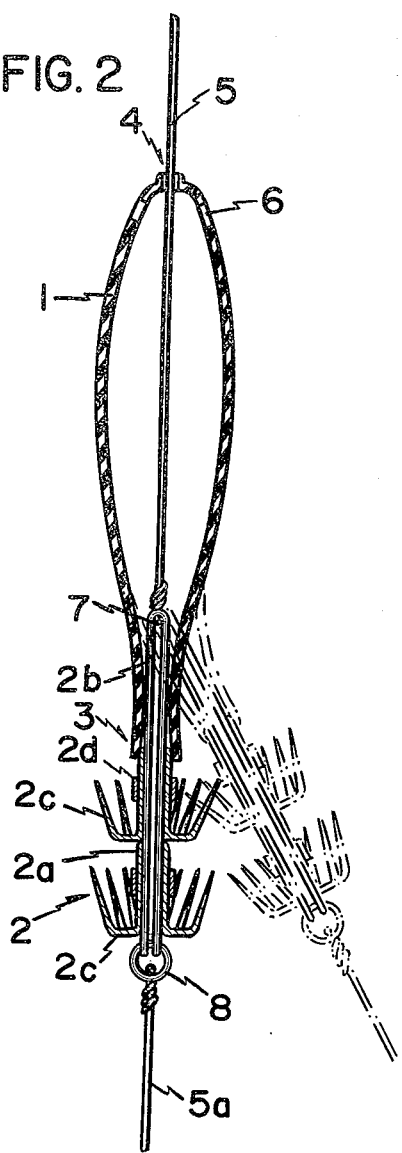
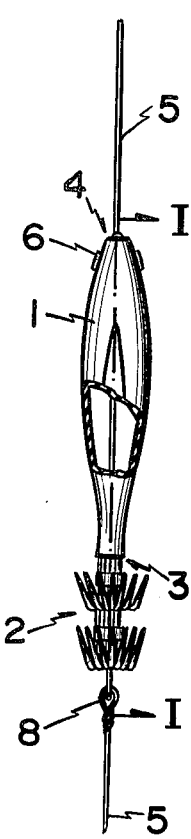
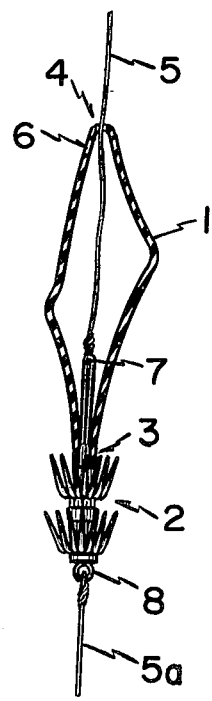

LURE FOR CATCHING SQUID AND THE LIKE

BACKGROUND OF THE INVENTION

This invention relates to a lure for catching squid and the like.

Conventional lures for catching squid and the like comprise a small lead body covered with rubber or cloth, and hooks are provided at one end of the lead body. However, because of the weight of the lead sinker which is also connected to the end of a fishing line, in addition to the weight of the lead body, the number of fishhooks which can be attached to a single fishing line is limited. In addition, using a large amount of lead on a lure tends to make it expensive.

Accordingly, an object of the present invention is to overcome the disadvantages of known prior art arrangements and to provide a lure for catching squid and the like which is inexpensive to produce and which facilitates hooking of the squid.

Another object of this invention is to provide a hollow lure made of flexible material, carrying a hook at one end, and which is adapted to be attached at both ends to a line so that a plurality of such lines may be connected in series.

A further object of this invention is to provide a lure which includes a hollow elastic body which is capable of being physically transformed or compressed in the direction of the fishing line to facilitate catching the squid and the like.

A still further object of this invention is to provide a lure having a perforated hollow elastic body in which bait may be contained and which may be used to cause bubbles to attract the squid.

Other objects of the present invention will become apparent from the following description of embodiments with reference to the accompanying drawings. However, it is not intended to be limited to the details shown, since various modifications and structural changes may be made therein within the scope and range of equivalent of the claims.

SUMMARY OF THE INVENTION

A lure for catching squid and the like includes a hollow elastic body and a hook device disposed at one end of the elastic body. A fishing line is connected to the hook device and arranged such that the elastic body will be compressed to facilitate catching squid or the like on that hook device when the fishing line is pulled up.

BRIEF DESCRIPTION OF THE DRAWINGS

FIG. 1 is an elevational view of a lure according to one embodiment of the present invention with a portion of the body being broken away and in section;

FIG. 2 is a vertical sectional view taken along the line I—I of FIG. 1 but on a larger scale than FIG. 1;

FIG. 3 is a vertical sectional view similar to FIG. 2 but showing the physical transformation of the body of the lure in the longitudinal direction as may be caused by the weight of a squid which has been caught by the lure;

DESCRIPTION OF THE PREFERRED EMBODIMENTS

Figure 6:
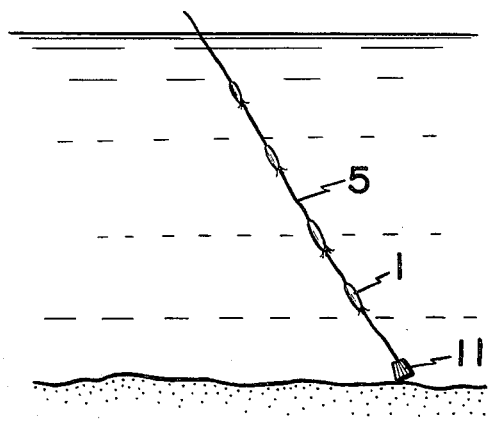
FIG. 6 is a schematic view showing a plurality of lures according to the present invention in practical use.

Referring to the drawings, there is shown in FIGS. 1 to 3 a first embodiment of the present invention. In this first embodiment, a lure for catching squid and the like includes a hollow elastic body 1 which is provided with a hook indicated generally at 2. The hook 2 has a core 2a and the upper part of the core 2a forms a shank 2b which passes into the interior of the elastic body 1 through a hole 3 in the lower end of the elastic body 1. The shank 2b is integral with and is a part of the core 2a. The elastic body 1 also has another hole 4 at its other longitudinal end for introducing a fishing line 5 into the elastic body 1. The elastic body 1 may be made of resilient material such as plastic, rubber or the like and may be colored, for example red, or yellow, or it may be coated with silver dust or luminous paint.

The core 2a is bent at its lower end and is arranged to receive a connecting ring 8 which is in turn connected to a fishing line 5a. The shank 2b also has a bent end 7 which is connected to the fishing line 5. Umbrella hooks 2c encircle the core 2a and are secured thereto by rings 2d to prevent their sliding on the core 2a.

As can best be seen in FIG. 2, the fishing line 5 is connected to the end loop 7 of the shank 2b of the hook and passes out of the elastic body 1 through the hole 4. It will be seen that by pulling of the fishing line 5, the hook 2 will be drawn into position as shown in FIG. 2 wherein the shank 2b passes through the hole 3 of the elastic body to be releasably held in the position shown in FIG. 2. Apertures 6 may be provided in the elastic body 1 to permit air or water to pass between the inside and outside of the elastic body 1 while providing bubbles.

As shown in FIG. 6, a suitable number of lures of the type shown in FIGS. 1 and 2 may be attached to a fishing line 5 in series arrangement and the line caused to descend in a body of water by the provision of a single weighted sinker 11 which may be made of lead.

If the fishing line is pulled up when a squid embraces or otherwise contacts the hollow elastic body 1, the latter tends to be compressed longitudinally towards the hook 2. The pressure applied to the lower end of the elastic body 1 by the hook 2 and the resistance of the water against the passage of the elastic body 1 therethrough as the fishing line 5 is pulled up will cause the elastic body to collapse longitudinally and thereby force the squid more deeply onto the hook 2. Expressed otherwise, when a squid is adjacent the hook 2 and the line is pulled up, the elastic body 1 will tend to collapse towards the hook 2 thereby tending to push the squid deeper onto the hooks 2. Thus, the squid will be embraced between the collapsing elastic body 1 and the hook 2 so that the hook 2 will bite more deeply into the squid as the fishing line 5 is pulled up. Because of the squid's weight, there will be a great resistance caused by the squid when the line is pulled up. For example, when pulling in the line in water of 150 meters deep, a resistance power of 1 to 3 kg works on the hollow elastic body.

From the above description, it will be seen that the lure according to the present invention operates to effectively catch and hook the squid when the fishing line is pulled up. In addition, it is possible to attach a large number of lures to a single fishing line and arrange these lures in series as shown in FIG. 6. Thus none of the individual lures need require any weight or lead or the like. Moreover, these light, hollow elastic bodies can sway somewhat in the sea and as the water passes inside and out of the hollow elastic bodies through the holes 6, small bubbles may rise through these apertures 6 which will tend to attract the attention of the squid. At the same time, the elasticity of the body 1 tends to prevent the squid from becoming unhooked as the line is pulled up.

Figures 4, 5:
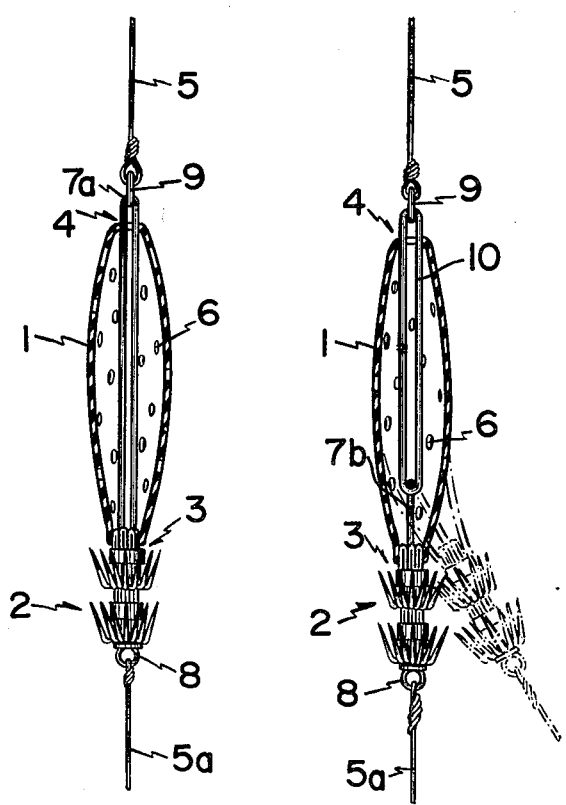
FIG. 4 is a vertical sectional view of a lure according to an alternate embodiment of the present invention.
FIG. 5 is a vertical sectional view of a lure according to a further alternate embodiment of the present invention.

It will be further seen, that due to the elastic nature of the body 1, the hook 2 may be displaced out of longitudinal alignment as shown by broken lines in FIGS. 2 and 5 thereby affording flexibility in its operation. Also bait may be placed in the elastic hollow body.

FIG. 4 shows a second embodiment of the present invention wherein like numerals are used for like parts. In the embodiment of FIG. 4, there is provided an elongated shank 7a on the hook 2. The elongated shank 7a extends the entire length of the elastic body 1 and passes out through the hole 4 in the upper end of the elastic body 1. The external portion of the shank 7a is connected to a connecting ring 9 which is in turn connected to the fishing line 5. The advantage of this arrangement is that there is avoided the necessity of having to thread the fishing line through the elastic body 1 of the lure. In other words, since the shank 7a passes externally of the elastic body 1, the fishing line 5 may be easily connected to the external part of the shank 7a.

In the embodiment of FIG. 5, the shank 7b of the hook 2 terminates within the elastic body 1 as in the embodiment of FIGS. 1 and 2 but in FIG. 5 the shank 7b of the hook 2 is connected to linking element 10 which passes through the hole 4 of the elastic body 1 to a position external of the body. The external part of the linking element 10 is connected to a connecting ring 9 which is in turn connected to the fishing line 5.

The arrangement in FIG. 5, as in the case of the embodiment of FIG. 4, also avoids the necessity of having to thread the line through the elastic body 1 of the lure. Another advantage of the FIG. 5 embodiment is that it is possible to wind up a plurality of such lures on a reel with minimum projecting parts inasmuch as there is a flexible joint between the shank of the hook and the linking element 10 and the lure can bend at this joint as the latter is wound up around a cylindrical body such as a reel.

As can be seen in the embodiments of FIGS. 4 and 5, a plurality of apertures 6 may be provided throughout the elastic body. FIG. 3 shows the elastic body partially collapsed.

It is thought that the invention and its attendant advantages will be understood from the foregoing description and that it will be apparent that various changes may be made in the form, construction, and arrangements of the parts without departing from the spirit and scope of the invention or sacrificing all of its material advantages. The forms heretofore described being merely preferred embodiments thereof.

What is claimed is:

1. A lure for catching squid and the like comprising a hollow elastic body, said hollow elastic body being elongated and having holes on each longitudinal end, a hook device disposed at one end of said elastic body, said hook device including a longitudinally contiguous core and shank, one or more umbrella-type hook elements disposed on said core, ring means disposed about said hook elements and said core to prevent the hook elements from sliding on said core, said shank passing through one of said holes at the longitudinal end of said hollow elastic body and extending into said hollow elastic body, said core being disposed outside said hollow elastic body adjacent to said one hole at the longitudinal end of said elastic body, said umbrella-type hook elements having first radial portions extending radially outwardly from said core and second longitudinal portions extending longitudinally toward said hollow elastic body, said core having a connector extending on the side of said radial portions opposite said elastic body, and means connecting said shank and said connector to a fishing line such that a plurality of lures may be connected in series and each elastic body is adapted to be compressed to facilitate catching squid or the like on said hook device when the fishing line having the series-connected lures is pulled up.

2. A lure according to claim 1 wherein said shank terminates within said hollow elastic body, said fishing line being connected to said shank at a flexible connecting location within said hollow elastic body, whereby the plurality of series-connected lures may be wound on a circular reel as each lure bends at said flexible connection location.

3. A lure according to claim 1 wherein said shank terminates within said hollow elastic body, a connecting link attached to said shank at a flexible connection location, said connection link extending through said hollow elastic body to pass out of said other hole in said elastic body, said fishing line being connected to said connecting link externally of said elastic body at a second flexible location, said plurality of series-connected lures being capable of being wound on a circular reel as each lure bends at said first and second flexible connection locations.

* * * * *